(12) United States Patent
Chowdhury

(10) Patent No.: US 6,631,694 B1
(45) Date of Patent: Oct. 14, 2003

(54) TEATCUP LINER SERIES

(76) Inventor: Mofazzal H. Chowdhury, 1301 Baitinger Ct., Sun Prairie, WI (US) 53590-1550

( * ) Notice: Subject to any disclaimer, the term of this patent is extended or adjusted under 35 U.S.C. 154(b) by 0 days.

(21) Appl. No.: 10/071,332

(22) Filed: Feb. 8, 2002

(51) Int. Cl.⁷ .................................................. A01J 5/08
(52) U.S. Cl. .................................................. 119/14.46
(58) Field of Search ...................................... 119/14.46

(56) References Cited

U.S. PATENT DOCUMENTS

| | | | |
|---|---|---|---|
| 3,096,740 A | 7/1963 | Noorlander | 119/14.52 |
| 3,289,634 A | 12/1966 | Simons | 119/14.52 |
| 3,659,558 A | 5/1972 | Noorlander | 119/14.52 |
| 3,967,587 A | 7/1976 | Noorlander | 119/14.49 |
| 4,269,143 A | 5/1981 | Erbach | 119/14.49 |
| 4,530,307 A | 7/1985 | Thompson | 119/14.49 |
| 4,537,152 A | 8/1985 | Thompson | 119/14.54 |
| 4,610,220 A | 9/1986 | Goldberg et al. | 119/14.47 |
| 5,178,095 A | 1/1993 | Mein | 119/14.47 |
| 5,218,924 A | 6/1993 | Thompson et al. | 119/14.02 |
| 5,291,853 A | 3/1994 | Steingraber et al. | 119/14.54 |
| 5,482,004 A | 1/1996 | Chowdhury | 119/14.52 |
| 5,493,995 A | 2/1996 | Chowdhury | 119/14.54 |
| 5,752,462 A | 5/1998 | Petersson | 119/14.47 |
| 6,039,001 A | 3/2000 | Sanford | 119/14.47 |
| 6,055,931 A | 5/2000 | Sanford, Jr. | 119/14.36 |
| 6,176,200 B1 | 1/2001 | Petterson | 119/14.47 |

FOREIGN PATENT DOCUMENTS

GB  975757  11/1964

*Primary Examiner*—Charles T. Jordan
*Assistant Examiner*—Bret Hayes
(74) *Attorney, Agent, or Firm*—Andrus, Sceales, Starke & Sawall, LLP

(57) ABSTRACT

A teatcup liner series, having n liners $L_1$ through $L_n$, has at least one selected parameter which varies liner to liner to provide selectable milking characteristics. The teatcup liner series is produced by a cost advantaged manufacturing method.

2 Claims, 7 Drawing Sheets

TEATCUP LINER SERIES

BACKGROUND AND SUMMARY

The invention relates to teatcup liners for use in a teatcup assembly for milking a mammal.

As known in the prior art, a plurality of teatcups are connected to respective teats suspending from the udder of a mammal such as a cow. Each teatcup assembly has a teatcup liner or inflation around a respective teat and defining a milk flow passage within the liner below the teat, and a pulsation chamber outside the liner between the liner and the teatcup shell, for example U.S. Pat. Nos. 4,269,143, 4,530,307, 5,178,095, 5,218,924, 6,055,931, all incorporated herein by reference. The system has a milking cycle with an on portion and an off portion. Milk flows from the teat towards a milking claw during the on portion, and then to a storage vessel. During the off portion, the liner is collapsed around the teat, to aid in the circulation of body fluids. Vacuum is continuously applied to the milk flow passage within the liner. Vacuum is alternately and cyclically applied to the pulsation chamber between the liner and the teatcup shell, to open and close the liner, all is known.

The present invention provides a liner series or family enabling the dairyman selectivity in choosing between the trade-off of liner slip versus milk harvest and milking speed. During continuing development efforts, various relationships have been discovered between various liner parameters, and in accordance therewith, a liner series has been developed having at least one and preferably a plurality of parameters which vary liner to liner in optimized manner to afford the noted selectivity.

In a further aspect of the invention, a particularly cost effective manufacturing method is provided for producing the liner series.

DETAILED DESCRIPTION OF THE INVENTION

Figure 1:
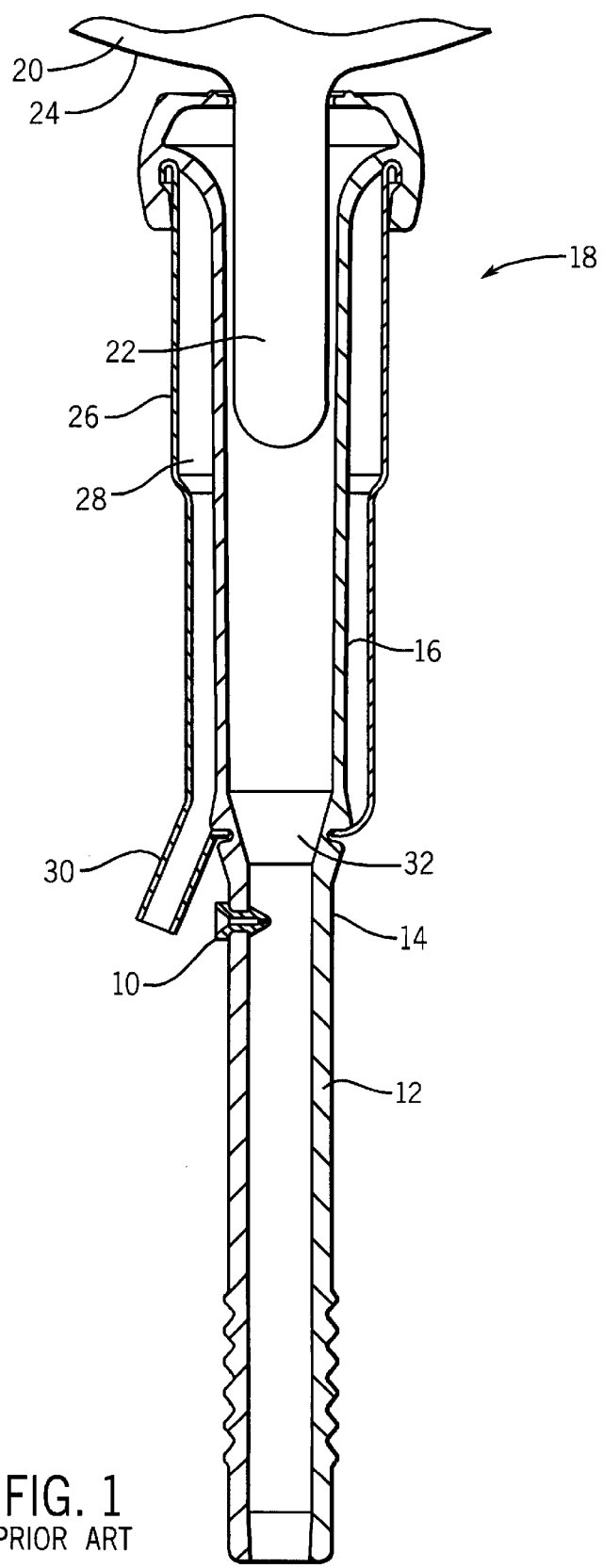
FIG. 1 is taken from U.S. Pat. No. 6,055,931 and is a side view partially in section of a teatcup assembly including a teatcup liner for milking a mammal.
Figure 2:
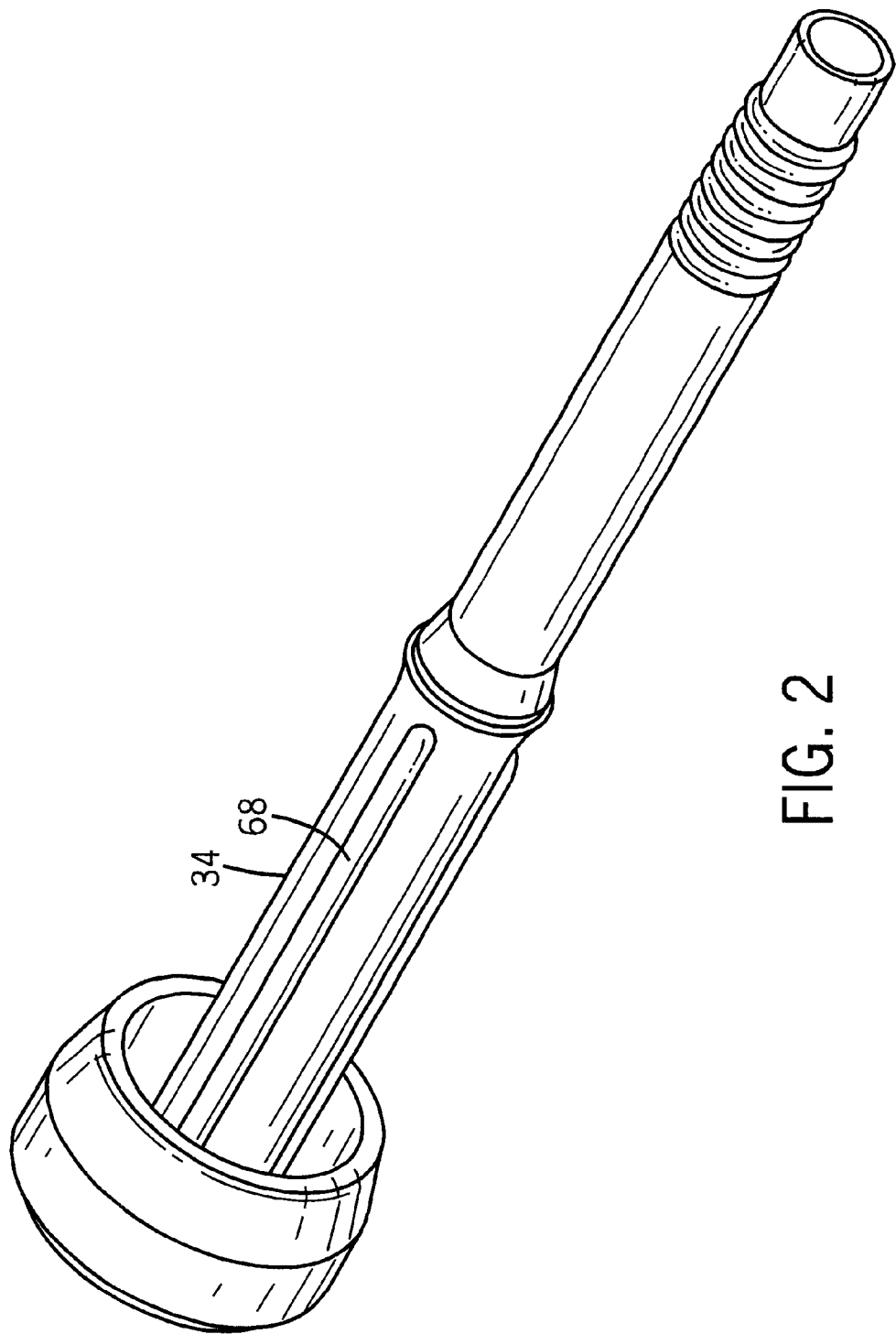
FIG. 2 is an isometric view of a teatcup liner.

FIG. 1 shows a teatcup assembly 18 for milking a mammal 20 such as a cow. Teat 22 suspending from udder 24 of the mammal extends into the liner. Teatcup shell 26 is typically a metal, or plastic, member defining an annular pulsation chamber 28 around liner 16 between the liner and the teatcup shell and having a pulsation port 30 for connection to a pulsator valve, as is known. Liner 16 is typically rubber or other flexible material. The lower end of milk tube portion 14 of the liner is connection to a claw, for example U.S. Pat. Nos. 4,537,152 and 5,291,853, incorporated herein by reference, which in turn supplies milk to a storage vessel. As noted above, vacuum is continuously applied to milk passage 32 within the liner through milk tube portion 14, and vacuum is alternately and cyclically applied to pulsation chamber 28 through port 30, to open and close liner 16 below teat 22, all as is known and for which further reference may be had to the above noted incorporated patents. An air vent plug 10 may be inserted through the wall 12 of the milk tube portion 14 of the teat liner, as is known, for example above noted incorporated U.S. Pat. No. 6,055,931. For further background, a teat liner is illustrated in isometric view at 34 in FIG. 2.

Figure 3:
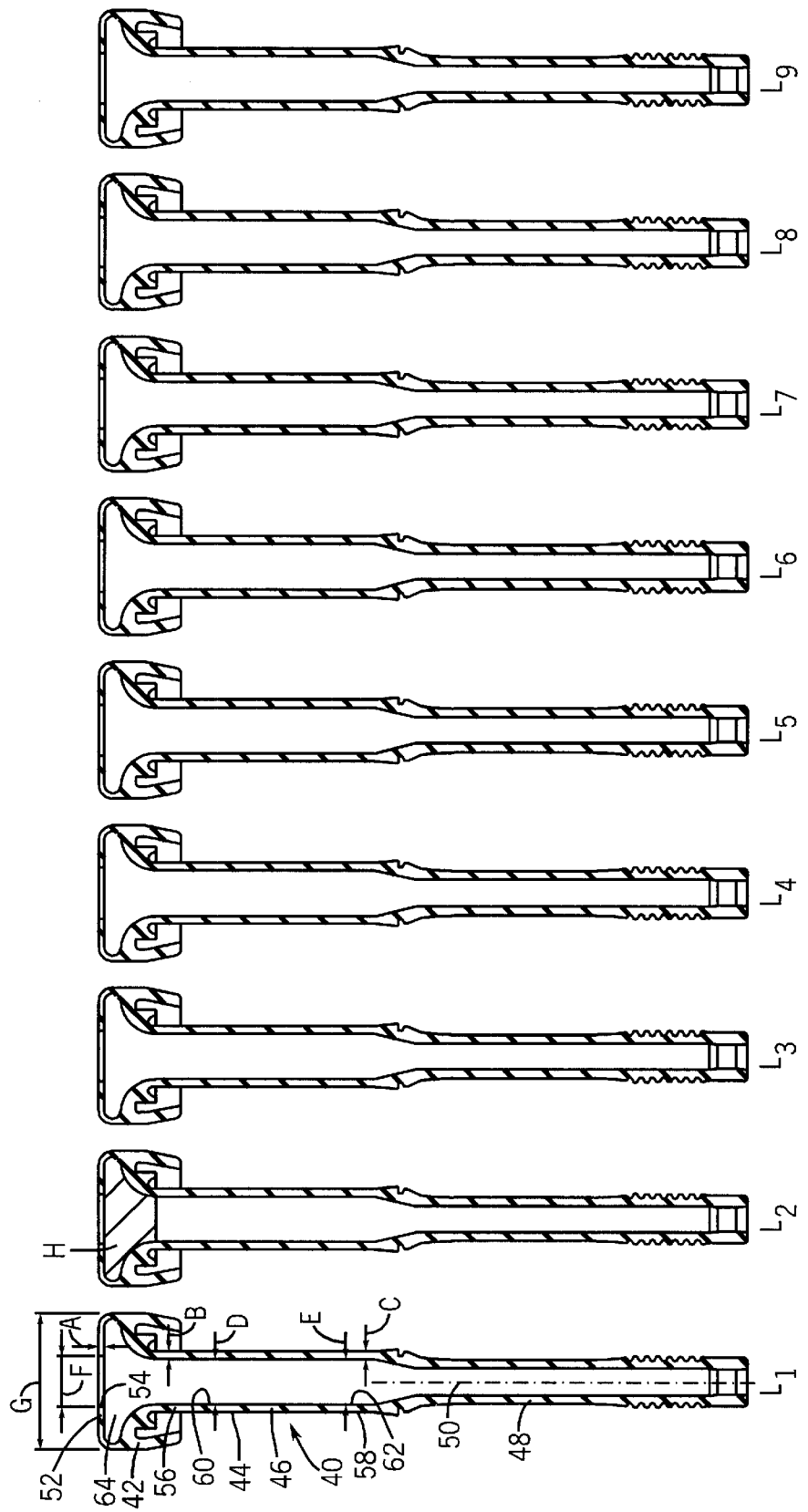
FIG. 3 shows a teatcup liner series in accordance with the invention.

FIG. 3 illustrates a teatcup liner series in accordance with the invention including in combination a plurality of related teatcup liners comprising n liners $L_1$ through $L_n$, for example as shown at the nine liners $L_1$ through $L_9$. Each liner such as 40 has an upper mouthpiece 42, an intermediate barrel 44 defined by a barrel wall 46, and a lower connecting tube 48. The barrel extends along an axial direction 50 for receiving teat 22 inserted axially thereinto through mouthpiece 42. The mouthpiece has an upper lip 52 having an aperture 54 therethrough for receiving teat 22. Lip 52 has an axial thickness A measured parallel to axial direction 50. Barrel wall 46 has axially spaced upper and lower portions 56 and 58. Upper portion 56 of barrel wall 46 has a transverse thickness B measured transversely to axial direction 50. Lower portion 58 of barrel wall 46 has a transverse thickness C measured transversely to axial direction 50. Upper portion 56 of barrel wall 46 has inner surfaces 60 defining a hollow interior with an upper transverse span D thereacross taken transversely to axial direction 50. Lower portion 58 of barrel wall 46 has inner surfaces 62 defining a hollow interior with a lower transverse span E thereacross taken transversely to axial direction 50. Lip aperture 54 has a transverse dimension taken transversely to axial direction 50 and defining a mouthpiece bore F. Mouthpiece 42 has a cavity 64 between lip 52 and barrel 44. Cavity 64 has a transverse dimension taken transversely to axial direction 50 and defining a cavity bore G. Cavity 64 has a volume H.

In one preferred embodiment, the noted parameters A through H are varied liner to liner from $L_1$ through $L_9$ as indicated in the table below, and as set forth in FIG. 3. The table below gives dimensions for A through G in millimeters (mm). For example, the axial thickness A of lip 52 varies from 2.0 mm for liner $L_1$ to 3.6 mm for liner $L_9$. The table gives dimensions in cubic inches (in$^3$) for H.

TABLE

| | LINER | | | | | | | | |
|---|---|---|---|---|---|---|---|---|---|
| | $L_1$ | $L_2$ | $L_3$ | $L_4$ | $L_5$ | $L_6$ | $L_7$ | $L_8$ | $L_9$ |
| A (mm) | 2.0 | 2.2 | 2.4 | 2.6 | 2.8 | 3 | 3.2 | 3.4 | 3.6 |
| B (mm) | 3.2 | 3.1 | 3.0 | 2.9 | 2.8 | 2.7 | 2.6 | 2.5 | 2.4 |
| C (mm) | 2.9 | 2.8 | 2.7 | 2.6 | 2.5 | 2.4 | 2.3 | 2.2 | 2.1 |
| D (mm) | 20.2 | 20.4 | 20.6 | 20.8 | 21 | 21.2 | 21.4 | 21.6 | 21.8 |
| E (mm) | 18.9 | 19.1 | 19.3 | 19.5 | 19.7 | 19.9 | 20.1 | 20.3 | 20.5 |
| F (mm) | 20.4 | 20.3 | 20.2 | 20.1 | 20.0 | 19.9 | 19.8 | 19.7 | 19.6 |
| G (mm) | 52.95 | 52.65 | 52.25 | 51.85 | 51.45 | 51.05 | 50.65 | 50.25 | 49.85 |
| H (in$^3$) | 1.368 | 1.353 | 1.336 | 1.318 | 1.301 | 1.283 | 1.265 | 1.248 | 1.230 |
| A − B (mm) | −1.2 | −0.9 | −0.6 | −0.3 | 0 | 0.3 | 0.6 | 0.9 | 1.2 |

The liner series is characterized by the following relationships, as illustrated in the table and FIG. 3: axial thickness A of lip 52 continually increases from $L_1$ through $L_n$, preferably linearly; transverse thickness of barrel wall 46, including both B and C, continually decreases from $L_1$ through $L_n$, preferably linearly; the transverse span across the hollow interior, including both D and E, continually increases from $L_1$ through $L_n$, preferably linearly; mouthpiece bore F continually decreases from $L_1$ through $L_n$, preferably linearly; cavity bore G continually decreases from $L_1$ through $L_n$, preferably linearly; cavity volume H continually decreases from $L_1$ through $L_n$.

In the preferred embodiment, B is always greater than C, and D is always greater than E, such that both the barrel wall thickness and the noted transverse span are tapered. In alternate embodiments, the barrel wall thickness and/or the transverse span may be untapered, i.e. straight.

Figure 4:
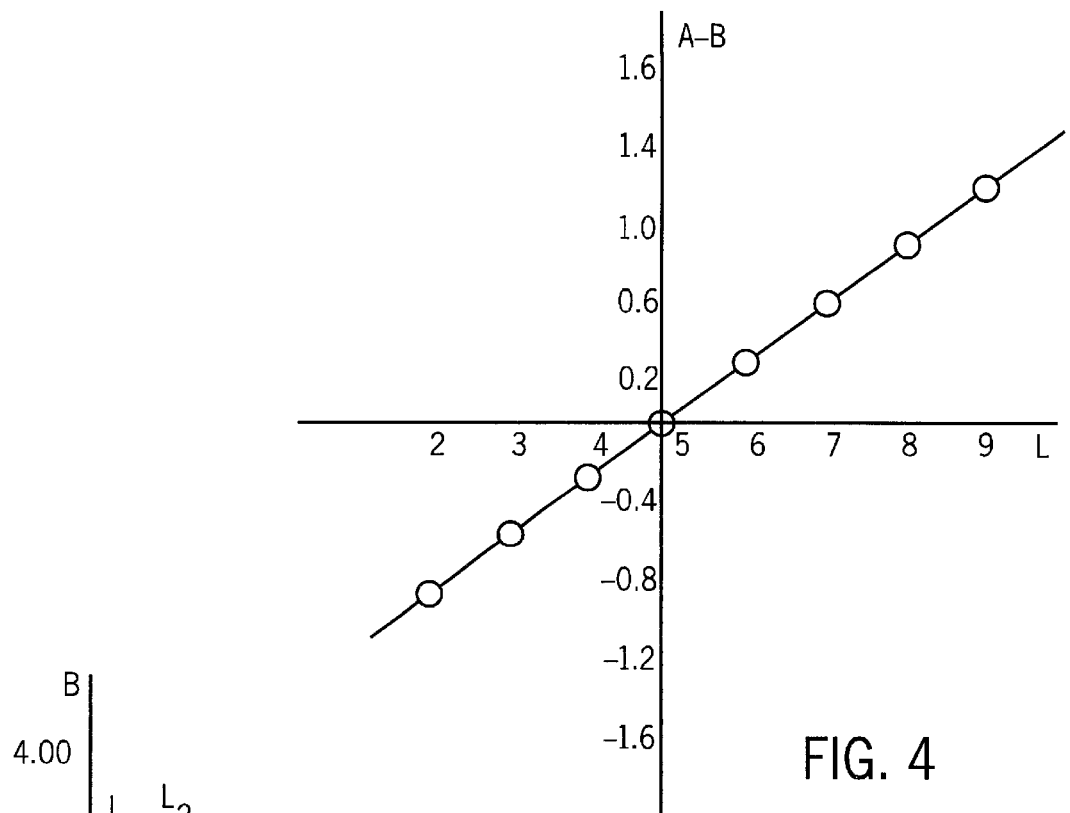
FIG. 4 is a graphical plot of a selected parameter which varies in accordance with the invention.

Further, in the preferred embodiment, the parameter A-B, i.e. the difference between A and B, varies as illustrated in the table, namely such difference continually increases from $L_1$ through $L_9$, preferably linearly, as further illustrated in FIG. 4.

Figure 5:
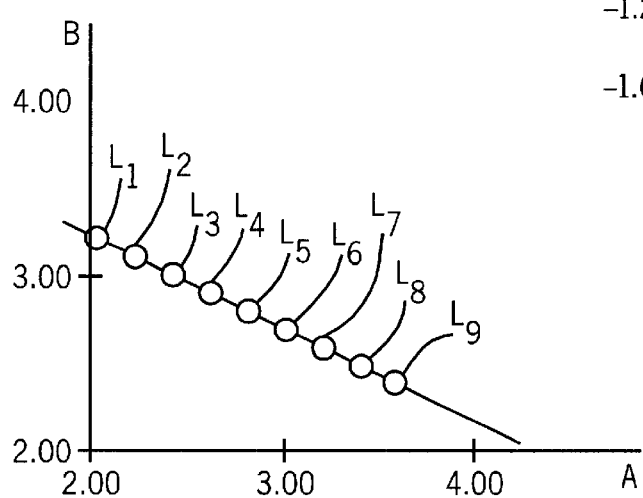
FIG. 5 is a graphical plot of the variance of a pair of parameters versus each other in accordance with the invention.

Further, in the preferred embodiment, in a plot, FIG. 5, of transverse thickness B of barrel wall 46 versus axial thickness A of lip 52 for liners $L_1$ through $L_9$, B decreases as A increases. Further preferably, B decreases linearly with respect to A.

Figure 6:
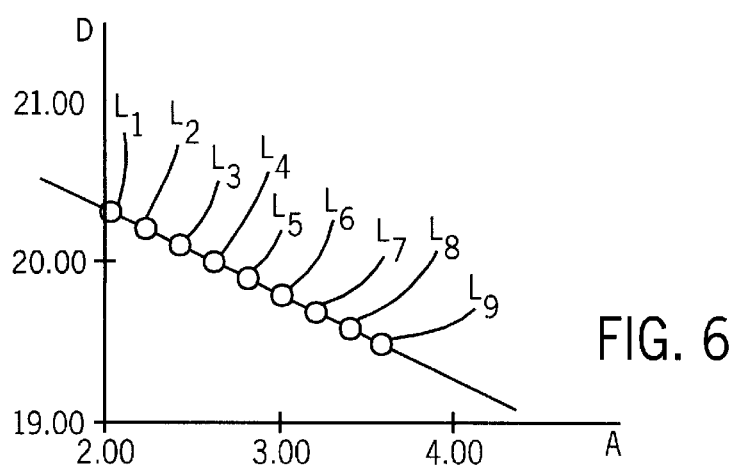
FIG. 6 is a graphical plot of the variance of another pair of parameters versus each other in accordance with the invention.

Further in the preferred embodiment, in a plot, FIG. 6, of transverse span D versus axial thickness A of lip 52 for $L_1$ through $L_9$, D decreases as A increases. Further preferably, D decreases linearly with respect to A.

Figure 7:
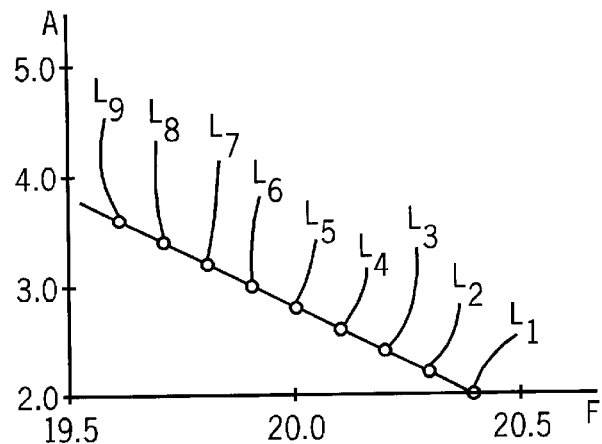
FIG. 7 is a graphical plot of the variance of another pair of parameters versus each other in accordance with the invention.

Further in the preferred embodiment, in a plot, FIG. 7, of axial thickness A of lip 52 versus mouthpiece bore F for $L_1$ through $L_9$, axial thickness A decreases as mouthpiece bore F increases. Further preferably, A decreases linearly with respect to F.

Figure 8:
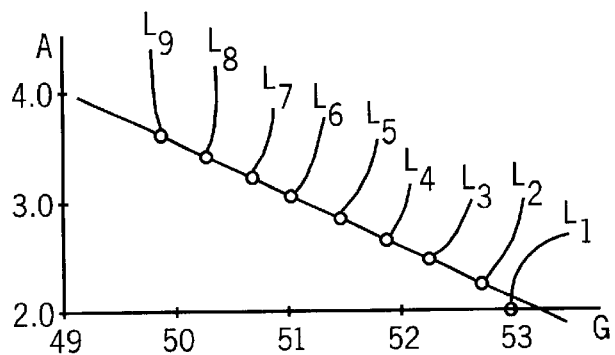
FIG. 8 is a graphical plot of the variance of another pair of parameters versus each other in accordance with the invention.

Further in the preferred embodiment, in a plot, FIG. 8, of axial thickness A of lip 52 versus cavity bore G for $L_1$ through $L_9$, axial thickness A decreases as cavity bore G increases. Further preferably, A decreases linearly with respect to G.

Figure 9:
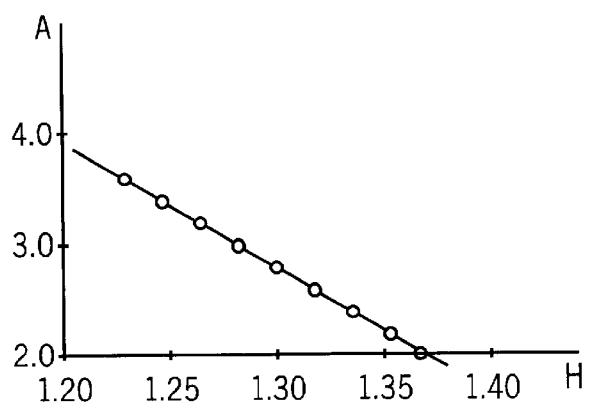
FIG. 9 is a graphical plot of the variance of another pair of parameters versus each other in accordance with the invention.

Further in the preferred embodiment, in a plot, FIG. 9, of axial thickness A of lip 52 versus cavity volume H for $L_1$ through $L_9$, axial thickness A decreases as cavity volume H increases. Further preferably, A decreases linearly with respect to H.

The disclosed combination enables selection of desired milking characteristics. Liner $L_1$ provides the highest milk harvest and highest milk speed, but also the greatest liner slip. Liner $L_9$ provides the lowest liner slip and also the lowest milk harvest and milking speed. The dairyman can choose the right balance and trade-off for his particular needs. As he moves left to right in FIG. 3, liner slip reduces as does milk harvest and milking speed. As he moves right to left in FIG. 3, liner slip increases as does milk harvest and milking speed.

Figure 10:
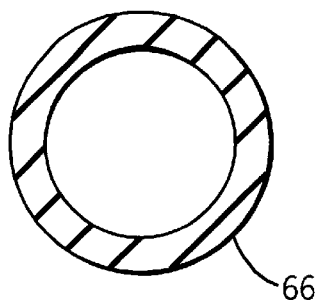
FIG. 10 is a cross-sectional view of a liner.
Figure 11:
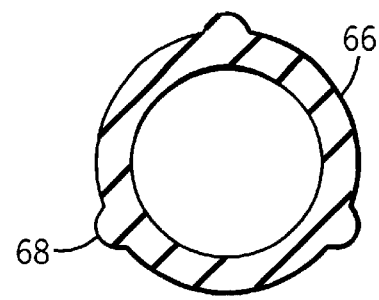
FIG. 11 is like FIG. 10 and shows another embodiment.
Figure 12:
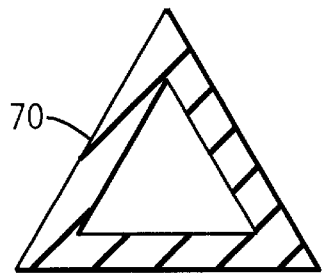
FIG. 12 is like FIG. 10 and shows another embodiment.
Figure 13:
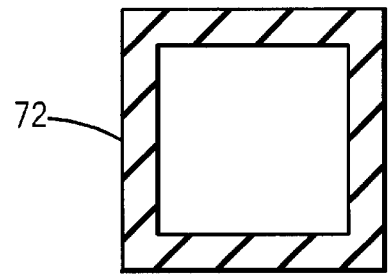
FIG. 13 is like FIG. 10 and shows another embodiment.
Figure 14:
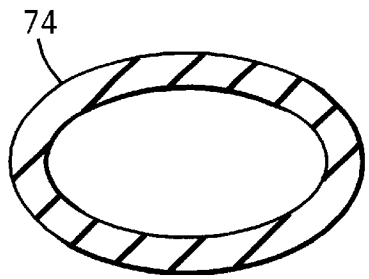
FIG. 14 is like FIG. 10 and shows another embodiment.
Figure 15:
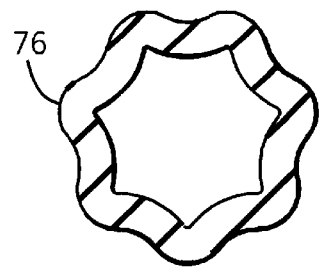
FIG. 15 is like FIG. 10 and shows another embodiment.

The liner is preferably round as shown at 66 in FIG. 10. The liner may additionally include a plurality of ribs such as 68, FIGS. 11 and 2, extending axially along the barrel. The ribs may be external as shown, and/or internal. The liner may be triangular as shown at 70 in FIG. 12. The liner may be square as shown at 72 in FIG. 13. The liner may be oval as shown at 74 in FIG. 14. The liner may be fluted as shown at 76 in FIG. 15.

The various combinations of parameters providing the noted selectivity of milking characteristics are set forth in the claims. Deflection of lip 52 is varied by parameter A, and may additionally or alternately be varied by varying the shore hardness of the lip material. Liner barrel tension is varied by varying the noted wall thickness B and C, and may alternately or additionally be varied by the addition of the noted ribs and/or changing the cross-section of individual ribs and/or changing liner material and/or changing barrel length.

Figure 16:
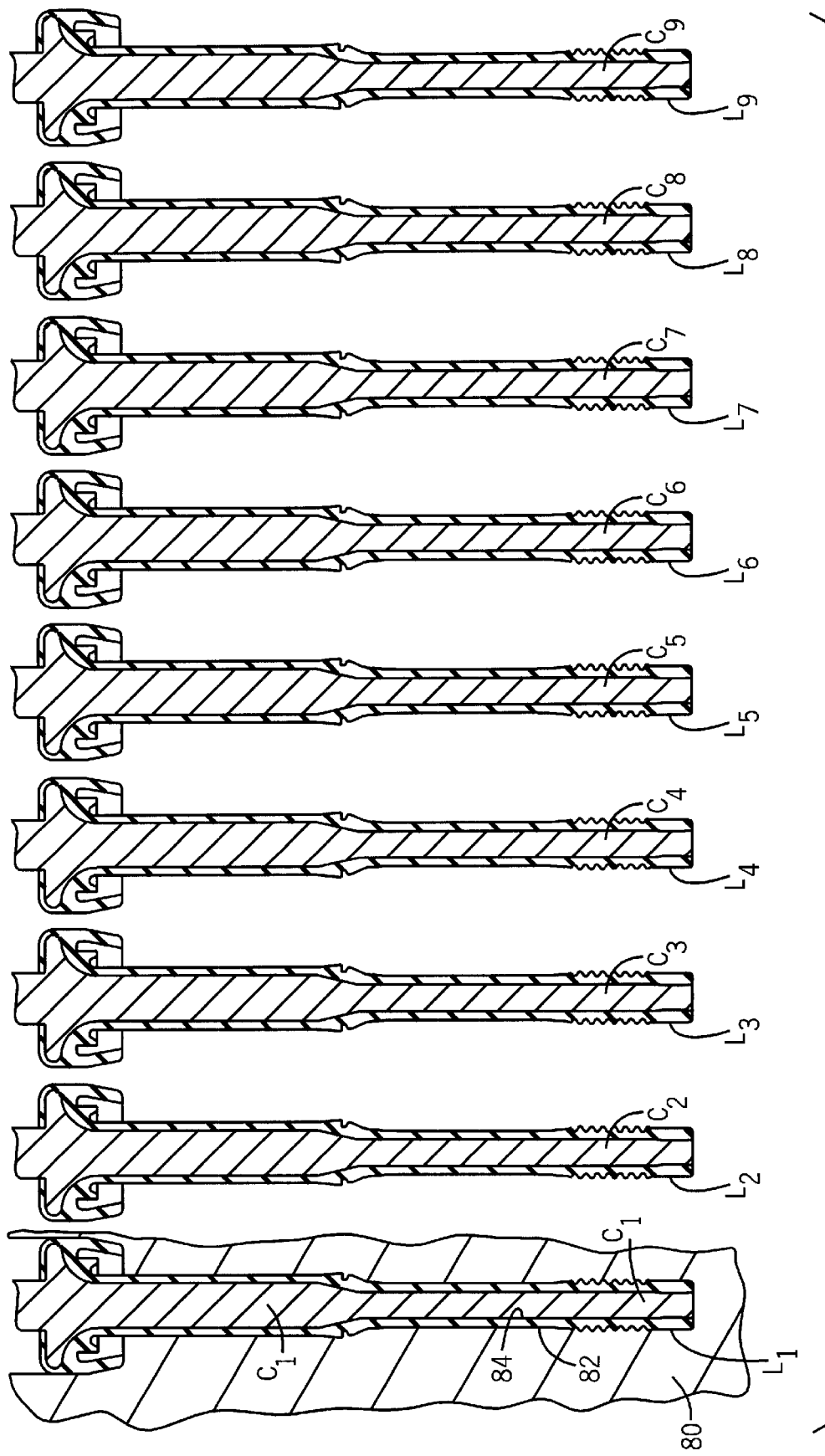
FIG. 16 is like FIG. 3 and illustrates a manufacturing method in accordance with the invention.

There is further provided a simple and particularly cost effective and economical manufacturing method for making the teatcup liner series. The method involves: forming a first of the liners $L_1$ in a mold 80, FIG. 16, having a first removable core $C_1$ inserted therein, the mold forming the outer profile surface 82 of liner $L_1$, the core $C_1$ forming the inner profile surface 84 of liner $L_1$; forming a second of the liners $L_2$ in the same mold 80 having a second removable core $C_2$ inserted therein, the mold 80 forming the outer profile surface 86 of liner $L_2$, the core $C_2$ forming the inner profile surface 88 of liner $L_2$; forming the remainder of the liners through $L_n$, e.g. $L_3$ through $L_9$, in the same mold 80 having respective removable cores through $C_n$, e.g. $C_3$ through $C_9$, inserted therein, the mold 80 forming the outer profile surface of the liners through $L_n$, the cores through $C_n$ forming the inner profile surfaces of the liners through $L_n$, e.g. cores $C_3$ through $C_9$ form the inner profile surfaces for liners $L_3$ through $L_9$, respectively. The same mold 80 is used for each of the liners $L_1$ through $L_9$. The outer profile surface is the same for each of liners $L_1$ through $L_9$. Different cores $C_1$ through $C_9$ are used for liners $L_1$ through $L_9$. The inner profile surface is different from liner to liner according to $C_1$ through $C_9$. Any or all or some combination of the noted parameters A-H are varied liner to liner according to $C_1$ through $C_9$. The cores change a selected dimensional parameter or parameters. This is particularly desirable from a manufacturing standpoint because of the savings in tooling cost by using a single mold to produce the liner series, rather than multiple molds, i.e. one for each liner. Instead, different cores are used to provide the variance liner to liner in the series. Cores are significantly less expensive than a mold.

It is recognized that various equivalents, alternatives and modifications are possible within the scope of the appended claims.

What is claimed is:

1. A teatcup liner series comprising in combination a plurality of related teatcup liners, each liner having an upper mouthpiece, an intermediate barrel defined by a barrel wall, and a lower connecting tube, said barrel extending along an axial direction for receiving a teat inserted axially thereinto through said mouthpiece, said mouthpiece having an upper lip having an aperture therethrough for receiving said teat, said teatcup liner series comprising n said liners $L_1$ through $L_n$ having at least one selected parameter which varies liner to liner, wherein:

said lip has an axial thickness measured parallel to said axial direction;

said barrel wall has a transverse thickness measured transversely to said axial direction;

a first of said parameters is said axial thickness of said lip;

a second of said parameters is said transverse thickness of said barrel wall;

wherein in combination both of the following conditions are satisfied:

said axial thickness of said lip continually increases from $L_1$ through $L_n$; and said transverse thickness of said barrel wall continually decreases from $L_1$ through $L_n$.

2. A teatcup liner series comprising in combination a plurality of related teatcup liners, each liner having an upper mouthpiece, an intermediate barrel defined by a barrel wall, and a lower connecting tube, said barrel extending along an axial direction for receiving a teat inserted axially thereinto through said mouthpiece, said mouthpiece having an upper lip having an aperture therethrough for receiving said teat, said teatcup liner series comprising n said liners $L_1$ through $L_n$ having at least one selected parameter which varies liner to liner, wherein:

said lip has an axial thickness measured parallel to said axial direction;

said barrel wall has a transverse thickness measured transversely to said axial direction;

said parameter is the difference between said axial thickness of said lip and said transverse thickness of said barrel wall; and said difference continually increases from $L_1$ through $L_n$.

* * * * *